(12) United States Patent
Sakugawa

(10) Patent No.: US 7,160,962 B2
(45) Date of Patent: *Jan. 9, 2007

(54) ELASTOMER-MODIFIED EPOXY SILOXANE COMPOSITIONS

(75) Inventor: Haruji Sakugawa, Anaheim, CA (US)

(73) Assignee: Ameron International Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/695,482

(22) Filed: Oct. 27, 2003

(65) Prior Publication Data

US 2004/0143060 A1 Jul. 22, 2004

Related U.S. Application Data

(63) Continuation of application No. 10/062,243, filed on Feb. 1, 2002, now Pat. No. 6,639,025.

(51) Int. Cl.
*C08L 83/06* (2006.01)

(52) U.S. Cl. ................ 525/476; 525/476; 525/479; 525/187; 525/523; 528/12; 528/17; 528/18; 528/14; 528/34; 528/38; 528/411; 528/412; 528/413; 528/414; 528/409

(58) Field of Classification Search ........... 525/476, 525/479, 187, 523; 528/12, 17, 18, 14, 34, 528/38, 411, 412, 413, 414, 409
See application file for complete search history.

(56) References Cited

U.S. PATENT DOCUMENTS

| | | | | |
|---|---|---|---|---|
| 2,467,171 A | * | 4/1949 | Werner et al. | 549/517 |
| 2,538,072 A | * | 1/1951 | Zech | 549/521 |
| 2,615,007 A | * | 10/1952 | Greenlee | 528/95 |
| 2,615,008 A | * | 10/1952 | Greenlee | 528/87 |
| 2,801,227 A | * | 7/1957 | Goppel | 526/68 |
| 3,033,803 A | * | 5/1962 | Price et al. | 528/87 |
| 3,576,827 A | * | 4/1971 | Dukes et al. | 549/515 |
| 3,859,314 A | * | 1/1975 | Dukes et al. | 549/515 |
| 3,928,490 A | * | 12/1975 | Hergenrother | 525/105 |
| 3,969,308 A | * | 7/1976 | Penneck | 523/212 |
| 3,992,014 A | * | 11/1976 | Retford | 473/372 |
| 4,201,698 A | * | 5/1980 | Itoh et al. | 524/83 |
| 4,250,074 A | * | 2/1981 | Foscante et al. | 523/428 |
| 4,463,129 A | * | 7/1984 | Shinada et al. | 525/63 |
| 4,657,986 A | * | 4/1987 | Isayama et al. | 525/407 |
| 4,804,581 A | * | 2/1989 | Geary et al. | 428/332 |
| 4,952,643 A | * | 8/1990 | Hirose et al. | 525/407 |
| 4,981,728 A | * | 1/1991 | Homma et al. | 427/386 |
| 5,108,824 A | * | 4/1992 | Wang et al. | 428/76 |
| 5,109,067 A | * | 4/1992 | Dae et al. | 525/101 |
| 5,431,765 A | * | 7/1995 | Decker et al. | 156/307.4 |
| 5,442,010 A | * | 8/1995 | Hauenstein et al. | 524/588 |
| 5,618,860 A | * | 4/1997 | Mowrer et al. | 523/421 |
| 5,703,178 A | * | 12/1997 | Gasmena | 525/476 |
| 5,804,616 A | * | 9/1998 | Mowrer et al. | 523/421 |

* cited by examiner

Primary Examiner—Kuo-Liang Peng
(74) Attorney, Agent, or Firm—Jeffer, Mangels, Butler & Marmaro LLP

(57) ABSTRACT

Elastomer-modified Epoxy-polysiloxane compositions of this invention are prepared by combining a silicone intermediate, with an epoxy resin, an elastomeric resinous intermediate, a polyfunctional amine, an optional organometallic catalyst, and optional fillers, pigments, and processing agents. The composition is prepared using a sufficient amount of water to promote hydrolysis of the polysiloxane and the polycondensation of the silanols produced by such hydrolysis. In its cured form, the epoxy-polysiloxane composition exists as a uniformly dispersed arrangement of linear epoxy chain fragments that are cross-linked with a continuous polysiloxane polymer chain, wherein either or both of the epoxy and/or polysiloxane polymers are elastomer modified to provide coatings and floorings having significantly improved properties of impact resistance, flexibility, crack resistance, and abrasion resistance with compared to conventional epoxy systems.

21 Claims, No Drawings

ELASTOMER-MODIFIED EPOXY SILOXANE COMPOSITIONS

RELATION TO COPENDING PATENT APPLICATION

This patent application is a continuation of U.S. patent applicantion Ser. No. 10/062,243 that was filed on Feb. 1, 2002, and that issued on Oct. 28, 2003 as U.S. Pat. No. 6,639,025.

FIELD OF THE INVENTION

This invention relates to epoxy resin based compositions useful for protective coatings and the like and, more specifically, to elastomer-modified epoxy siloxane polymer compositions having improved properties of flexibility, weatherability, and chemical resistance.

BACKGROUND OF THE INVENTION

Epoxy siloxane compositions useful for application as coating materials are well known, and have gained commercial acceptance as protective and decorative coatings for steel, aluminum, galvanizing, wood and concrete in maintenance, marine, construction, architectural, aircraft and product finishing markets. While epoxy-based compositions have long been known for their desired properties of good adherence to substrates, corrosion resistance, and chemical resistance, and weatherability, they have suffered from less than ideal properties of weatherability and related gloss retention. Epoxy siloxane compositions were developed to provide improved properties of weatherability and gloss retention without sacrificing the desired properties of corrosion resistance and chemical resistance.

U.S. Pat. No. 4,250,074 discloses a known epoxy siloxane composition comprising an interpenetrating polymer network (IPN) of intertwined epoxy polymers and polysiloxane polymers. The composition is prepared by simultaneously polymerizing, at substantially balanced reaction rates, a mixture of epoxy resin and silane groups to form two intertwined networks of polymerized epoxy and polysiloxane throughout a resulting coating. An amine curing agent is used to form the polymerized epoxy network, and water is distributed throughout the mixture to cause hydrolytic polycondensation of silane groups to form the polysiloxane. While this epoxy siloxane coating composition displayed improved properties of weatherability, corrosion and chemical resistance when compared to conventional nonsiloxane-containing epoxy resin compositions, it is known to be somewhat brittle, lacking a desired degree of impact resistance, flexibility and abrasion resistance for certain applications.

U.S. Pat. No. 5,618,860 discloses a known epoxy polysiloxane composition for use as a coating. The composition is prepared by combining a non-aromatic epoxy resin with a difunctional aminosilane hardener, an organotin catalyst, and an optional pigment. The so-formed epoxy polysiloxane composition provided improved properties of weatherability, chemical and corrosion resistance, and impact resistance when compared to conventional nonsiloxane-containing epoxy resin compositions. While this epoxy siloxane coating composition provided such improved performance properties, like the epoxy siloxane composition discussed above, it too is known to be somewhat brittle, lacking a desired degree of impact resistance, flexibility and abrasion resistance for certain applications.

It is, therefore, desired that an epoxy siloxane composition be developed that is both capable of providing the desired properties of weatherability, corrosion and chemical resistance already associated with epoxy siloxane compositions, while also providing improved properties of impact resistance, flexibility and abrasion resistance. It is desired that epoxy siloxane compositions of this invention provide improved resistance to cracking and delamination when applied in the form of coatings.

SUMMARY OF THE INVENTION

An elastomer-modified epoxy siloxane composition is prepared, according to principles of this invention, by combining in the presence of water: (1) a silicone intermediate preferably in the form of an alkoxy or silanol-functional polysiloxane; with (2) an epoxy resin preferably having more than one 1,2-epoxide groups per molecule, and an epoxide equivalent weight in the range of from 100 to about 5,000; (3) an elastomeric resinous intermediate having a functionality selected from the group consisting of hydroxyl, isocyanate, carboxyl, epoxy, mercaptan, and amine, and being selected from the group of resins consisting of butenes, polybutenes, butadienes, polybutadienes, nitrites, acrylonitiriles, polysulfides, and combinations thereof; and (4) a polyfunctional amine curative agent. An optional organometallic catalyst can be used to facilitate cure at ambient temperature conditions.

The elastomer-modified epoxy siloxane composition may comprise in the range of from about 1 to 40 percent by weight silicone intermediate, 1 to 15 percent by weight polyfunctional amine, 5 to 60 percent by weight epoxy resin, and 1 to 25 percent by weight elastomeric resinous intermediate.

These above-identified ingredients undergo hydrolysis and polycondensation reactions when combined in the presence of water to form elastomer-modified epoxy polymers or elastomer-modified polysiloxane polymers, depending on the choice of elastomeric resinous intermediate, that copolymerize with polysiloxane polymers and/or epoxy polymers to form a fully-cured elastomer-modified epoxy siloxane polymer composition. Ultimately, the chemical and physical properties of the elastomer-modified epoxy siloxane compositions of the present invention are affected by judicious choice of epoxy resin, silicone intermediate, polyfunctional amine hardener, and pigment. Elastomer-modified epoxy siloxane compositions of this invention are unique, when compared to conventional epoxy polysiloxane compositions, in that the incorporated elastomer serves to provide an improved degree of flexibility, impact resistance, crack resistance, and abrasion resistance to finally-cured coatings formed therefrom. These improved properties are provided without detracting from the desired properties of weatherability, chemical and corrosion resistance.

DETAILED DESCRIPTION OF THE INVENTION

Elastomer-modified epoxy siloxane compositions of this invention are prepared, according to one example, by reacting an epoxy-containing ingredient with a polyamine or aminosilane ingredient to form a cured epoxysilane polymer, and reacting the aminosilane ingredient with a silicone intermediate to form a polysiloxane polymer. Epoxy siloxane compositions of this invention are referred to as being "elastomer-modified" due to the additional reaction of an elastomeric resin with the epoxy-containing ingredient, the silicone intermediate, or the aminosilane or polyamine depending on the type of elastomeric resin functionality. Elastomer-modified epoxy siloxane compositions of this invention provide improved properties of impact resistance, flexibility, and abrasion resistance when compared to conventional nonelastomer-modified epoxy siloxane compositions.

Elastomer-modifier epoxy siloxane compositions are prepared, according to principles of this invention, by combining in the presence of water;
(a) an aromatic or nonaromatic epoxy resin having at least two 1,2-epoxide groups; with
(b) an alkoxy or silanol-functional silicone intermediate;
(c) a polyfunctional amine;
(d) a reactive elastomeric resinous intermediate; and
(e) an optional organometallic catalyst Elastomer-modified epoxy siloxane compositions of this invention may also contain other components such as optional pigments and/or solvents, Theological modifiers, plasticizers, thixotropic agents, antifoam agents and solvents and the like to achieve the desired properties sought by the user.

With respect to the epoxy resin ingredient, useful epoxy resins include more than one 1,2-epoxy group per mole and may be saturated or unsaturated, aliphatic, cycloaliphatic, or heterocyclic. The epoxide resins generally contain glycidyl ester or glycidyl ether groups, have a weight per epoxide (i.e., an epoxide equivalent weight) of from 100 to 5,000, and have a reactivity of about two. The epoxy resin is preferably provided in liquid rather than solid form.

Example epoxy resins useful for forming compositions of this invention include glycidyl polyethers of polyhydric phenols which are derived from an epihalohydrin, e.g., epichlorohydrin, and a polyhdric phenol. Examples of such polyhydric phenols include resorcinol, hydroquinone, bis(4-hydroxyphenyl)-2,2-propane, or bisphenol A as it is commonly called, 4,4'-dihydroxybenzophenone, bis(4-hydroxyphenyl)-1,1-ethane, bis(4-hydroxyphenyl)-1,1-isobutane, bis(4-hydroxy-phenyl)-2,2-butane, bis(2-dihydroxynaphthyl)methane, phloroglucinol, bis(4-hydroxyphenyl) sulfone. Additional polyhydric phenols are novolac resins containing more than two phenol, or substituted phenol, moieties linked through methylene bridges as well as halogenated, e.g., brominated and chlorinated phenolic compounds.

Additional useful epoxy resins include glycidyl polyethers of polyhydric alcohols prepared by reacting a polyhydric alcohol with an epihalohydrin using an acidic catalyst, e.g., boron trifluoride, and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanediol, hexanetriol, trimethylol propane, trimethylol ethane, pentaerythritol and the like.

Epoxy resins and their preparations are described in U.S. Pat. Nos. 2,467,171, 2,615,007, 2,615,008, 2,801,227, 2,538,072 and 3,033,803, which are herein incorporated by reference.

Still other example epoxy resins include glycidyl esters of polycarboxylic acids which are derived from an epihalohydrin and a polycarboxylic acid using procedures described in U.S. Pat. Nos. 3,859,314 and 3,576,827, which are herein incorporated by reference. Examples of polycarboxylic acids include phthalic acid or its anhydride, isophthalic acid, terephthalic acid, tetrahydrophthalic acid, hexahydrophthalic anhydride, adipic acid, dimeriezed fatty acids, dibasic acids made from an unsaturated fatty acid and acrylic acid and the like.

Epoxy resins useful for forming for weather resistant coating compositions include Epirez 505 from Rhone-Poulenc located in Lousiville, Ky.; Epon DPL-862, Eponex 1510 and Eponex 1513 (hydrogenated bisphenol A-epichlorohydrin epoxy resin) from Resolution Performance Products in Houston, Tex.; Santolink LSE-120 from Monsanto located in Springfield, Mass.; Epodil 757 (cyclohexane dimethanol diglycidylether) from Air Products and Chemicals located in Allentown, Pa.; Araldite XUGY358 and PY327 from Vantico located in Hawthorne, N.Y.; Aroflint 393 and 607 from Reichold located in Durham, N.C.; and ERL4221 from Union Carbide located in Tarrytown, N.Y.

Epoxy resins useful for forming chemical resistant coatings include blends of Resolution Epon 828 (bisphenol A-epichlorohydrin epoxy resin) with difunctional epoxide reactive diluents such as neopentylglycol diglycidylether, resorcinol diglycidylether and cyclohexanedimethanol diglycidylether, bisphenol F epoxy resins i.e., Resolution Epon DPL 862 (bisphenol F-epiclorohydrin epoxy resin) and epoxy phenol novalac resins such as: Epalloy 8250 (epoxy novalac resin) from CVC located in Cherry Hill, N.J.; Araldite EPN 1139 from Vantigo; and DEN432 and DEN438 from Dow Chemical.

Preferred epoxy resins include epichlorohydrin-bisphenol A epoxy resins, epochlorohydrin bisphenol F epoxy resins, hydrogenated bisphenol A epichlorohydrin epoxy resins, glycidyl methacrylate resins, glycidyl esters, phenol novolac epoxy resins and resorcinol-modified epoxy resins which have at least two epoxy groups in a molecule. These epoxy resins are preferred because they enable formation of a three-dimensional cross-linked network by reaction with an amino-functional compound or compounds as described in better detail later.

Preferred epoxy resins useful for providing chemically resistant compositions include those that are the combination of standard epichlorohydrin-bisphenol A epoxy resin with phenol novolac epoxy resin. Preferred epoxy resins useful for providing good weatherability, gloss retention, and color retention include hydrogenated bisphenol A epichlorohydrin resins and glycidy methacrylate-based acrylic resins.

In the range of from 5 to 60 percent by weight of the epoxy resin ingredient, based on the total weight of the composition, is used to prepare elastomer-modified epoxy siloxane compositions of this invention. It is to be understood that this amount reflects the total amount of epoxy resin ingredients that are used to prepare the composition, which can comprise a single epoxy resin ingredient or a combination of two or more different epoxy resin ingredients.

Using less than about 5 percent by weight of the epoxy resin will produce a final composition having an undesired degree of chemical resistance and/or weatherability for many coating applications. Using greater than about 60 percent by weight epoxy resin will produce a final composition having an undesired degree of flexibility, impact resistance, and abrasion resistance due to the limited amount of the elastomeric ingredient. A preferred weight percent range for the epoxy resin ingredient is between 10 and 30. A particularly preferred elastomer-modified epoxy siloxane composition is prepared by using approximately 20 percent by weight of the epoxy ingredient, based on the total weight of the composition.

With respect to the silicone intermediate used to make up the resin component, preferred silicone intermediates include, but are not limited to, those having the following formula:

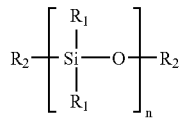

where each $R_1$ is selected from the group consisting of the hydroxy group, oxygen, and alkyl, aryl, and alkoxy groups having up to six carbon atoms. Each $R_2$ is selected from the group consisting of hydrogen and alkyl and aryl groups having up to six carbon atoms. It is preferred that $R_1$ and $R_2$ comprise groups having less than six carbon atoms to facilitate rapid hydrolysis of the silicone intermediate, which reaction is driven by the volatility of the alcohol analog product of the hydrolysis. $R_1$ and $R_2$ groups having greater than six carbon atoms tend to impair the hydrolysis of the silicone intermediate due to the relatively low volatility of each alcohol analog.

It is preferred that the "n", or number of repeating Si—O groups in the molecule backbone, be selected so that the silicone intermediate ingredient have a weight-average molecular weight in the range of from about 400 to about 10,000. A silicone intermediate ingredient having a weight-average molecular weight of less than about 400 can produce a composition that is too brittle for practical coating applications. A silicone intermediate ingredient having a weight-average molecular weight of greater than about 10,000 can produce a composition having a viscosity outside a desired range of from about 1,000 to 15,000 centipoise (cP) at 20° C., making the composition too viscous for application without adding solvent in excess of current volatile organic content (VOC) requirements.

Preferred silicone intermediate ingredients are alkoxy or silanol-functional. Particularly preferred alkoxy-functional silicone intermediates are methoxy-functional polysiloxanes and include, but are not limited to: DC-3074 and DC-3037 from Dow Corning; GE SR191, SY-550, and SY-231 from Wacker located in Adrian, Mich. Preferred silanol-functional silicone intermediates include, but are not limited to, Dow Corning's DC840, Z6018, Q1-2530 and 6-2230.

In the range of from 1 to 40 percent by weight of the silicone intermediate ingredient, based on the total weight of the composition, is used to prepare elastomer-modified epoxy siloxane compositions of this invention. It is to be understood that this amount reflects the total amount of silicone intermediate ingredients that are used to prepare the composition, which can comprise a single silicone intermediate ingredient or a combination of two or more different silicone intermediate ingredients. Using less than about 1 percent by weight of the silicone intermediate will produce a final composition having an undesired degree of chemical resistance and/or weatherability for many coating applications. Using greater than about 40 percent by weight silicone intermediate will produce a final composition having an undesired degree of brittleness, i.e., low impact resistance, in the cured film.

A preferred weight percent range for the silicone intermediate ingredient is between 2 and 20. A particularly preferred elastomer-modified epoxy siloxane composition is prepared by using approximately 5 percent by weight of the silicone intermediate ingredient, based on the total weight of the composition.

With respect to the polyfunctional amine ingredient, useful polyfunctional amine ingredients for forming elastomer-modified epoxy siloxane compositions of this invention include aminofunctional silicone compounds and amine functional compounds, and can be selected from the general classes of aliphatic amines and polyamines, aliphatic amine adducts, polyamidoamines, cycloaliphatic amines and polyamines, and cycloaliphatic amine adducts, aromatic amines, Mannich bases, ketimines, and amine-functional butadiene acrylonitrile such as ATBN available from Noveon.

A preferred amine ingredient is an aminosilane that is at least difunctional, i.e., having at least two active hydrogens, and which may have the following general formula:

where Y is $H(HNR)_a$, and where "a" is an integer of from 1 to 6, each R is a difunctional organic radical independently selected from the group consisting of aryl, alkyl, dialkylaryl, alkoxyalkyl, and cycloalkyl radicals, and where R can vary within each Y molecule. Each X can be the same or different, and is limited to alkyl, hydroxyalkyl, alkoxyalkyl and hydroxyalkoxyalkyl groups containing less than about six carbon atoms. At least 0.7 equivalents of amine or 0.2 moles of aminosilane per equivalent of epoxy may be present in the amine ingredient. The aminosilane can be replaced in whole or in part with an organic amine curative.

Preferred aminosilanes include, but are not limited to: aminoethyl aminopropyl triethoxysilane, n-phenylaminopropyl trimethoxysilane, trimethoxysilylpropyl diethylene triamine, 3-(3-aminophenoxy)propyl trimethoxy silane, amino ethyl amino methyl phenyl trimethoxy silane, 2 amino ethyl 3 aminopropyl, tris 2 ethyl hexoxysilane, n-aminohexyl aminopropyl trimethoxysilane, trisaminopropyl trismethoxy ethoxy silane, gamma-aminopropyltrimethoxysilane, gamma-aminopropyltriethoxysilane, gamma-aminopropymethyldimethoxysilane, N-beta-(aminoethyl)-gamma-aminopropyltrimethoxysilane, N-beta-(aminoethyl)-gamma-aminopropyltriethoxysilane, and N-beta-(aminoethyl)-gamma-aminopropymethyldimethoxysilane. These amino-functional compounds can be used alone or in combination with one or more other amino-functional compounds The manufacturers and trade names of some aminosilanes useful in the present invention are listed in Table 1

TABLE 1

| Aminosilanes | |
|---|---|
| Manufacturer | Product Designation |
| Dow Corning | Z6020, XI-6100, XI6150 |
| OSI Specialities | A1100, A1101, A1102, A1108, A1110, A1120, A1126, A1130, A1387, Y9632 |
| Wacker | ED117 |
| Sivento | A0696, A0698, A0699, A0700, A0710, A0720, A0733, A0733, A0742, A0750, A0800 |
| PCR | 12328-1 |

Preferred amine ingredients are at least difunctional silanes. A particularly preferred difunctional silane is N-beta-(aminoethyl)-gamma-aminopropyltrimethoxysilane. Difunctional aminosilanes are desired because it has been found that the combination of an aminosilane having a reactivity of two, i.e., having only two amine hydrogens, reacts with the non-aromatic epoxy, also having a reactivity of two, to form a linear noncross-linked epoxy polymer that displays improved weatherability. Use of the aminosilane ingredient is desired to provide the property of chemical resistance, to acids such as sulfuric acid and acetic acid, to the finally-cured coating.

Such preferred amines and aminosilanes produce elastomer-modified epoxy siloxane compositions that, when applied as a substrate coating, exhibit superior weatherability in terms of both color and gloss retention. In the range of from 1 to 25 percent by weight of the amine ingredient, based on the total weight of the composition, is used to prepare elastomer-modified epoxy siloxane compositions of this invention. It is to be understood that this amount reflects the total amount of amine ingredients that are used to prepare the composition, which can comprise a single amine ingredient or a combination of two or more different amine ingredients.

Using less than about 1 percent by weight of the amine ingredient will produce a final composition having an undesired degree of chemical resistance and/or weatherability for many coating applications. Using greater than about 25 percent by weight amine ingredient will produce a final composition having an undesired degree of amine blush. The formation of blush (sometimes called blooming or exodate) usually has a detrimental effect on coating performance because it can lead to gloss reduction, increased yellowing, poor recoatability, and intercoat adhesion problems. Using more than 25 percent by weight amine ingredient can also promote carbamate formation and water spotting from regions of amine, carbon dioxide and water at the coating surface. A preferred weight percent range for the amine ingredient is between 2 and 20. A particularly preferred elastomer-modified epoxy siloxane composition is prepared by using approximately 7 percent by weight of the amine ingredient, based on the total weight of the composition.

In preparing elastomer-modified epoxy-siloxane compositions of the present invention, the proportion of amine ingredient to the epoxy resin can vary over a wide range, regardless of whether the amine is chosen from the general classes of polyfunctional amines, or from polyfunctional aminosilanes of the general formula above, or any combination thereof. In general, the epoxy resin component is cured with sufficient amine ingredient to provide at least from about 0.7 to about 1.2 amine equivalent weight per 1 epoxide equivalent weight, or with at least 0.2 moles of aminosilane per epoxide equivalent weight. If the amount of amine added provides less than 0.7 amine equivalent weight per epoxide equivalent weight, the resulting coating composition produced can exhibit a slow cure time and display inferior weatherability and chemical resistance. If the amount of amine added provides greater than 1.2 amine equivalent weight per epoxide equivalent weight, the resultant coating composition can exhibit surface blushing or greasiness.

With respect to the reactive elastomeric resinous intermediate ingredient, suitable reactive elastomeric resin intermediates include those having hydroxyl, epoxy, isocyanate, carboxyl, epoxy, mercaptan, or amine functionalities. Example reactive elastomeric resin intermediates include hydroxyl-functional polybutenes; hydroxy and isocyanate-functional polybutadiene resin available, for example, from ARCO of Lyondell, Newtown Square, Pa., sold under the product designation Poly-BD; urethane-modified epoxy resins available, for example, from Reichhold of Durham, N.C., sold under the product designation Epotuf 95-472; urethane-modified amine curatives available, for example, from Resolution Performance Products of Houston, Tex., sold under the product designation Euredur 70; Aradur 70 available, for example, from Vantico of Basil, Switzerland; amine and carboxy-functional butadiene-acrylonitrile resins available, for example, from Noveon Speciality Chemicals of Brecksville, Ohio, sold under the product designations ATBN and CTBN; epoxy adducts of amine and carboxy-functional butadiene-acrylonitirile resins available, for example, from Resolution, sold under the product designations Epon 58005, 58006, 58042, and 58901, from Reichhold sold under the product designations Kelpoxy 519-K2-70, Kelpoxy G-272, and Kelpoxy G293, and from CVC Specialty Chemicals of Mapleshade, N.J., sold under the product designations Erisys EMR-95, Erisys EMRA-1340 and Erisys EMRF-1320; and the mercaptan and epoxy-functional polysulfide resins available, for example, from Rohm & Haas of Philadelphia, Pa. sold under the product designation Thiokol LP. Other elastomeric resinous ingredients found useful in the practice of this invention include amine-functional resins Epi-Cure DPC-3163, Epi-Cure 3164 and Epi-Cure 3260 from Resolution Performance Products.

Preferred reactive elastomeric resinous intermediates include the epoxy adducts of amine and carboxy-functional butadiene-acrylonitrile resins (for example, Resolution Epon 58005 and Reichhold Kelpoxy G272). These particular reactive elastomeric resinous intermediates are preferred because they have a sufficient elastomer content and a weight-average molecular weight of the adducted resin to provide optimum properties of flexibility and viscosity to the coating composition.

In the range of from 1 to 25 percent by weight of the reactive elastomeric resinous intermediate, based on the total weight of the composition, is used to prepare elastomer-modified epoxy siloxane compositions of this invention. It is to be understood that this amount reflects the total amount of reactive elastomeric resinous intermediate ingredients that are used to prepare the composition, which can comprise a single reactive elastomeric resinous intermediate ingredient or a combination of two or more different reactive elastomeric resinous intermediate ingredients.

Using less than about 1 percent by weight of the reactive elastomeric resinous intermediate ingredient will produce a final composition having an undesired degree of flexibility, impact resistance, and abrasion resistance for many coating applications. Using greater than about 25 percent by weight of the reactive elastomeric resinous intermediate ingredient will produce a final composition that is very viscous, making such coating very difficult to apply above 25 percent.

A preferred weight percent range for the reactive elastomeric resinous intermediate ingredient is between 2 and 20. A particularly preferred elastomer-modified epoxy siloxane composition is prepared by using approximately 4 percent by weight of the reactive elastomeric resinous intermediate ingredient, based on the total weight of the composition.

Elastomer-modified epoxy siloxane compositions of this invention are formulated for application with conventional air, airless, air-assisted airless and electrostatic spray equipment, brush, or roller. The compositions are intended to be used as protective coatings for steel, galvanizing, aluminum, concrete and other substrates at dry film thicknesses in the range of from 25 micrometers to about two millimeters, and can be applied as protective floorings for convention floor surfaces at dry film thicknesses in the range of from about 15 to 200 millimeters.

Pigments and/or fillers can be used if desired to provide colored or textured coating compositions. Useful color pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. Useful fillers include conventional fillers known in the coatings industry such as silica powder, talc (magnesium silicate), clays such as china clay (aluminum silicate), wollastonite (calcium silicate), calcium carbonate, barites (barium sulfate), barium metaborate, aluminum trihydrate, graphite, zinc, aluminum, copper and the like.

The amount of pigment that is used to form the composition is understood to vary, depending on the particular composition application, the requirement of hiding over the substrate or undercoat, and can be zero when a clear or colorless composition is desired. In an example embodiment where a grey colored coating is desired, a combination of two different pigments, e.g., lampblack and titanium dioxide can be used. An example elastomer-modified epoxy siloxane composition may comprise up to about 70 percent by weight pigment and/or filler, based on the total weight of the composition. Using greater than 70 percent by weight pigment and/or filler can produce a composition that is too viscous for application.

The pigment and/or filler can be added as part of the resin components used to form the composition, e.g., with the epoxy resin, silicone intermediate, and reactive elastomer resinous intermediate, and/or can be added as a separate powder component. The pigment and/or filler, when added as part of the resin component, is dispersed with a Cowles mixer to at least 3 Hegman fineness of grind, or alternatively is ball milled or sand milled to the same fineness of grind. Selection of a fine particle size pigment and/or filler, and dispersion or milling to about 3 Hegman grind, allows for the atomization of mixed resin and cure components for application by conventional air, air-assisted airless, airless and electrostatic spray equipment, and provides a smooth, uniform surface appearance after application.

Water is an important ingredient of the present invention and should be present in an amount sufficient to bring about both the hydrolysis of the silicone intermediate and the subsequent condensation of the silanol groups. The sources of water are mainly atmospheric humidity and adsorbed moisture on the pigment material. Additional "free" water may be added to accelerate cure depending on ambient conditions, such as the use of the coating and flooring composition in arid environments. A preferred elastomer-modified epoxy siloxane composition comprises up to a stoichiometric amount of water to facilitate hydrolysis. Compositions that are prepared without added water may not contain the amount of moisture needed for the hydrolysis and condensation reactions, and may therefore produce a composition product having an insufficient degree of ultraviolet, corrosion and chemical resistance. Compositions that are prepared using greater than about one percent by weight water tend to hydrolyze and polymerize to form an undesirable gel before application.

If desired, water may be added to either the epoxide resin ingredient or the polyfunctional amine ingredient. Other sources of water may include trace amounts present in the epoxide resin ingredient, polyfunctional amine ingredient, thinning solvent, or other ingredients. Water may also be incorporated by using ketimines or alcohol-solvent-water mixtures as described in U.S. Pat. No. 4,250,074, which is incorporated herein by reference.

Regardless of its source, the total amount of water that is used should be the stoichiometric amount needed to facilitate the hydrolysis reaction. Water exceeding the stoichiometric amount is undesirable since excess water acts to reduce the surface gloss of the finally-cured composition product. Since coating compositions of this invention can be applied, for flooring application, in thickness from about 15 to about 200 millimeters, it is important to add a sufficient amount of water and distribute the same uniformly in the combined material to ensure proper drying and curing for the higher thickness applications. A particularly preferred elastomer-modified epoxy siloxane composition is prepared by using less than about 0.1 percent by weight water.

With respect to the optional organometallic catalyst, suitable organometallic catalysts useful for forming elastomer-modified epoxy siloxane compositions of this invention include the metal driers well known in the paint industry, e.g. zinc, manganese, zirconium, titanium, cobalt, iron, lead and tin each in the form of octoates, neodecanates and naphthanates. Suitable catalysts include organotin catalysts having the general formula

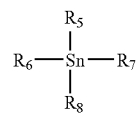

where R5 and R6 are each selected from the group consisting of alkyl, aryl, and alkoxy ester groups having up to eleven carbon atoms, and where R7 and R8 are each selected from the same groups as R5 and R6, or from the group consisting of inorganic atoms such as halogens, sulphur or oxygen. Dibutyl tin dilaurate, dibutyl tin diacetate, dibutyl tin diacetyl acetonate, dibutyl tin diethyl hexaoate, organotitanates, sodium acetate, and aliphatic secondary or tertiary polyamines including propylamine, ethylamino ethanol, triethanolamine, triethylamine, and methyl diethanol amine may be used alone or in combination to accelerate hydrolytic polycondensation of silicone intermediate and silane. A preferred catalyst is dibutyl tin dilaurate.

Up to about five percent by weight of the organometallic catalyst, based on the total weight of the composition, is used to speed drying and curing of the elastomer-modified epoxy siloxane compositions of this invention. The organometallic catalyst can be added to the resin component, or may be added as an entirely separate component. It is to be understood that this amount reflects the total amount of organometallic catalyst ingredients that are used to prepare the composition, which can comprise a single organometallic catalyst ingredient or a combination of two or more different organometallic catalyst ingredients. Using greater than about five percent by weight of the organometallic catalyst ingredient will produce a final composition having a pot life or working time that may be to short for practical use.

Elastomer-modified epoxy siloxane compositions of the present invention are generally low in viscosity and can be spray applied without the addition of a solvent. However, organic solvents may be added to improve atomization and application with electrostatic spray equipment or to improve flow, leveling, and/or appearance when applied by brush, roller, or standard air and airless spray equipment. Exemplary solvents useful for this purpose include esters, ethers, alcohols, ketones, glycols and the like. The maximum amount of solvent added to compositions of the present invention is limited by government regulation under the Clean Air Act to approximately 420 grams solvent per liter of the composition.

Elastomer-modified epoxy siloxane compositions of the present invention may also contain rheological modifiers, plasticizers, antifoam agents, flow control agents, slip and mar agents, thixotropic agents, pigment wetting agents, bituminous and asphaltic extenders, antisettling agents, diluents, UV light stabilizers, air release agents and dispersing aids. A preferred elastomer-modified epoxy siloxane composition may comprise up to about ten percent by weight such modifiers and agents.

Elastomer-modified epoxy siloxane compositions of the present invention can be supplied as a two-package system in moisture proof containers, wherein one package contains the resin components, i.e., the epoxy resin, silicone intermediate, and reactive elastomeric resinous intermediate, and any pigment and/or filler, additives and solvent if desired. A second package contains the polyfunctional amine ingredient and any optional catalysts or accelerating agents. Alternatively, compositions of this invention can be supplied as a three-package system, wherein a first package contains the resin components, a second package contains the polyfunctional amine ingredient, and a third package contains the powder components, e.g., the pigments and/or fillers.

Elastomer-modified epoxy siloxane compositions of the present invention can be applied and fully cure at ambient temperature conditions in the range of from about −6° C. to 50° C. At temperatures below −18° C. cure is severely retarded. However, compositions of the present invention may be applied under bake or cure temperatures up to 150° C. to 200° C.

While not wishing to be bound by any particular theory or mechanism, it is believed that elastomer-modified epoxy siloxane compositions of the present invention are formed by the following reactions. The epoxy resin ingredient reacts the amine moiety of the polyfunctional amine or aminosilane ingredient and undergoes an epoxy-amine addition reaction to form a three-dimensional cross linked network.

In the event that the silicone intermediate is alkoxy-functional, it is believed to undergo a hydrolysis reaction in the presence of water to form a silanol-functional silicone intermediate. The silanol-functional silicone intermediate then undergoes hydrolytic polycondensation to produce alcohol and polysiloxane polymers.

The reactive elastomeric resinous intermediate is believed to react in the following manner. If the elastomeric resinous ingredient is hydroxy or carbonyl-functional, it reacts with the silanol groups of the silicone intermediate and forms part of the polysiloxane polymer. If the elastomeric resinous ingredient is epoxy-functional, it reacts with the polyfunctional amine or aminosilane ingredient and forms part of the epoxy-silane polymer. If the elastomeric resinous ingredient is mercaptan or amine-functional, it reacts with the epoxy resin ingredient and forms part of the epoxy-silane polymer.

The so formed elastomer-modified epoxy polymer or elastomer-modified polysiloxane polymer copolymerize, i.e., the silane moiety of the aminosilane undergoes hydrolytic polycondensation with the polysiloxane, with the other of the polysiloxane polymer or epoxy polymer to form a fully-cured elastomer-modified epoxy siloxane polymer composition. In its cured form, the elastomer-modified epoxy siloxane polymer composition exists as a uniformly dispersed arrangement of linear epoxy chain fragments that are cross-linked with a continuous polysiloxane polymer chain, thereby forming a non-interpenetrating elastomer-modified polymer network (IPN) chemical structure that has substantial advantages over conventional epoxy polysiloxane systems.

When the ingredients are combined, it is believed that the silane moiety of the aminosilane ingredient condenses with the silicone intermediate ingredient, and the epoxy resin undergoes chain extension with by reaction with the amino groups pendent from the silicone intermediate polysiloxane to form a fully-cured elastomer-modified epoxy siloxane composition. As discussed above, either the polysiloxane polymer or epoxy-silane polymer may be elastomer modified depending on the particular type of elastomer functionality. In such reaction it is believed that the epoxy resin functions as a cross-linking enhancer that adds to the cross-link density of the composition without diminishing the beneficial features of the polysiloxane.

Ultimately, the chemical and physical properties of the elastomer-modified epoxy siloxane compositions of the present invention are affected by judicious choice of epoxy resin, silicone intermediate, polyfunctional amine hardener, and pigment. Elastomer-modified epoxy siloxane compositions of this invention are unique, when compared to conventional epoxy polysiloxane compositions, in that the incorporated elastomer serves to provide an improved degree of flexibility, cracking resistance, impact resistance and abrasion resistance to finally-cured coatings formed therefrom. These improved properties are provided without detracting from the desired properties of weatherability, chemical and corrosion resistance.

Additionally, elastomer-modified epoxy siloxane compositions of this invention provide improved cured film properties, such as reduced shrinkage and improved resistance to cracking and delamination when compared to conventional epoxy polysiloxane compositions. Conventional epoxy polysiloxane compositions are highly cross linked and exhibit high shrinkage when fully cured, which shrinkage can result in cracking or delamination of coating or flooring formulations on steel or concrete substrates.

These and other features of the present invention will become more apparent upon consideration of the following examples:

EXAMPLE 1

A resin component was prepared by combining approximately 10 grams epoxy phenol novalac resin (Epalloy 8250 or EPN 9850CH), 0.14 grams additive (BYKO80 defoamer), 3 grams Titanium dioxide pigment, 0.1 grams lampblack pigment, 4 grams silicone intermediate (DC-3074, SY231 alkoxy-functional silicone intermediate), 9 grams bisphenol A epoxy resin (DER 331), 3 grams elastomer-modified resin (Kelpoxy G272-100 epoxy-terminated elastomeric copolymer), and 0.04 grams deionized water. To the resin component was added a cure component in the form of approximately 7 grams aminosilane (Z6020 aminosilane), and a powder component in the form of 45 grams silica, and 19 grams talc. The resin, cure, and powder components were combined and mixed by hand for a period of one or two minutes.

EXAMPLE 2

A resin component was prepared by combining approximately 10 grams epoxy phenol novalac resin (Epalloy 8250 or EPN 9850CH), 0.14 grams additive (BYKO80 defoamer), 3 grams Titanium dioxide pigment, 0.1 grams lampblack pigment, 4 grams silicone intermediate(DC-3074, SY231 alkoxy-functional silicone intermediate), 7 grams bisphenol A epoxy resin (DER 331), 7 grams elastomer-modified resin (Kelpoxy G272-100 epoxy-terminated elastomeric copolymer), and 0.04 grams deionized water. To the resin component was added a cure component in the form of approximately 7 grams aminosilane (Z6020 aminosilane), and a powder component in the form of 45 grams silica, and 19 grams talc. The components were combined and mixed by hand for a period of from one or two minutes. The composition was similar to that prepared according to Examiner 1, except that it included a reduced amount of epoxy resin and a roughly doubled amount of the elastomer resinous intermediate ingredient.

The elastomer-modified epoxy siloxane compositions of Examples 1 and 2 were prepared using cylindrical compressive strength test specimens having a dimension of 1"diameter by 1"high. The test specimens were cured at room temperature for 14 days and then immersed completely into solutions of concentrated sulfuric acid, concentrated hydrochloric acid, methanol and ammonium hydroxide for 7 days. Afterwards, each test specimen was evaluated for coating integrity and displayed satisfactory coating integrity. Compressive strength was measured per ASTM C579 before and after immersion into the above-described chemicals. All of the test specimens retained greater than 90 percent of their initial compressive strength after immersion. These results are comparable or better than other conventional epoxy-siloxane composition known in the art.

The elastomer-modified epoxy siloxane compositions of Examples 1 and 2 were also applied to the surface of concrete blocks at a film thickness of 80 to 120 millimeters for purposes of temperature cycling. A concrete block was also coated with a conventional epoxy polysiloxane composition at the same coating thickness for comparative purposes. The coated blocks were cured at ambient temperature for seven days, and exposed to a temperature of 60° C. for seven days. This temperature cycle was repeated until one of the coated blocks developed cracking or delamination from the concrete. Elastomer-modified epoxy siloxane compositions of Examples 1 and 2 demonstrated superior resistance to cracking and delamination, by showing no signs of cracking or delamination within the same number of temperature cycles that it took the block coated with the conventional epoxy polysiloxane to fail by cracking and delaminating.

Although elastomer-modified epoxy siloxane compositions of the present invention have been described with considerable detail with reference to certain preferred variations thereof, other variations are possible. Therefore, the spirit and scope of the appended claims should not be limited to the preferred variations described herein.

What is claimed is:

1. An elastomer-modified epoxy siloxane composition comprising:
    water;
    an alkoxy or silanol-functional silicone intermediate;
    an amine curative agent selected from the group consisting of amino-functional compounds and aminofunctional silicone compounds;
    an epoxy resin; and
    an elastomeric resinous intermediate having a functionality selected from the group consisting of hydroxyl, epoxy, isocyanate, carboxyl, mercaptan, and amine.

2. The elastomer-modified epoxy siloxane composition as recited in claim 1 wherein the amine curative agent is an aminosilane.

3. The elastomer-modified epoxy siloxane composition as recited in claim 1 additionally comprising at least one organometallic catalyst to facilitate cure at ambient temperature.

4. The elastomer-modified epoxy siloxane composition as recited in claim 1 wherein the elastomeric resinous intermediate is selected from the group consisting of epoxy resins, polybutene resins, polybutadiene resins, acrylonitrile resins, polysulfide resins, and combinations thereof.

5. The elastomer-modified epoxy siloxane composition as recited in claim 1 wherein the silicone intermediate has a weight-average molecular weight of from 400 to 10,000.

6. The elastomer-modified epoxy siloxane composition as recited in claim 1 wherein the epoxy resin ingredient is selected from die group consisting of epichlorohydrin-bisphenol A epoxy resins, epochlorohydrin bisphenol F epoxy resins, hydrogenated bisphenol A epichlorohydrin epoxy resins, glycidyl methacrylate resins, glycidyl esters, phenol novalac epoxy resins, resorcinol-modified epoxy resins, and combinations thereof.

7. The elastomer-modified epoxy siloxane composition as recited in claim 1 wherein the elastomer-modified epoxy siloxane composition in its cured form exists as a uniformly dispersed arrangement of linear epoxy chain fragments that are cross-linked with a continuous polysiloxane chain.

8. The elastomer-modified epoxy siloxane composition as recited in claim 1 wherein the amine curative agent is an aminosilane that includes at least two active hydrogens, and the epoxy resin has more than one 1,2-epoxide groups per molecule.

9. The elastomer-modified epoxy siloxane composition as recited in claim 1 comprising from about 0.7 to 1.2 amine equivalent weight per epoxide equivalent weight.

10. An elastomer-modified epoxy siloxane composition prepared by combining;
    water;
    a silicone intermediate selected from the group consisting of alkoxy and silanol-functional polysiloxanes;
    an aminosilane;
    an epoxy resin having at least two 1,2-epoxide groups; and
    an elastomeric resinous intermediate having a functionality selected from the group consisting of hydroxyl, epoxy, isocyanate, carboxyl, mercaptan, and amine.

11. The elastomer-modified epoxy siloxane composition as recited in claim 10 wherein the silicone intermediate has the formula

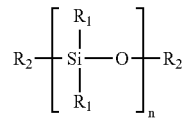

where each $R_1$ is selected from the group consisting of hydroxy, alkyl, aryl and alkoxy groups having up to six carbon atoms, each $R_2$, is selected from the group consisting of hydrogen, alkyl, and aryl groups having up to six carbon atoms.

12. The elastomer-modified epoxy siloxane composition as recited in claim 10 wherein the epoxy resin ingredient is selected from the group consisting of epichlorohydrin-bisphenol A epoxy resins, epichlorohydrin bisphenol F epoxy resins, hydrogenated bisphenol A epichlorohydrin epoxy resins, glycidyl methacrylate resins, glycidyl esters, phenol novalac epoxy resins, resorcinol-modified epoxy resins, and combinations thereof.

13. The elastomer-modified epoxy siloxane composition as recited in claim 10 additionally comprising at least one metal catalyst to facilitate cure at ambient temperature, wherein the catalyst is selected from the group consisting of zinc, manganese, zirconium, titanium, cobalt, iron, lead, and tin each in the form of octonates, neodecanates, or naphthanates.

14. The elastomer-modified epoxy siloxane composition as recited in claim 10 comprising in the range of from about 1 to 40 percent by weight silicone intermediate, 1 to 15 percent by weight aminosilane, 5 to 60 percent by weight epoxy resin, and 1 to 25 percent by weight elastomeric resinous intermediate.

15. An elastomer-modified epoxy siloxane composition prepared by combining in the presence of water:
a silicone intermediate having the formula

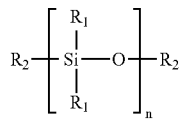

where each $R_1$ is selected from the group consisting of hydroxy, alkyl, aryl and alkoxy groups having up to six carbon atoms, each $R_2$ is selected from the group consisting of hydrogen, alkyl, and aryl groups having up to six carbon atoms and, wherein n is selected so that the weight-average molecular weight for the polysiloxane is in the range of from about 400 to 10,000;
an aminosilane;
an epoxy resin having an epoxide equivalent weight in the range of from 100 to about 5,000; and
an elastomeric resinous intermediate having a functionality selected from the group consisting of hydroxyl, epoxy, isocyanate, carboxyl, mercaptan, and amine.

16. The elastomer-modified epoxy siloxane composition as recited in claim 15 additionally comprising at least one organometallic metal catalyst to facilitate cure at ambient temperature.

17. The elastomer-modified epoxy siloxane composition as recited in claim 15 comprising from about 0.7 to 1.2 amine equivalent weight per epoxide equivalent weight.

18. The elastomer-modified epoxy siloxane composition as recited in claim 15 comprising in the range of from about 1 to 40 percent by weight silicone intermediate, 1 to 15 percent by weight aminosilane, 5 to 60 percent by weight epoxy resin, and 1 to 25 percent by weight elastomeric resinous intermediate.

19. The elastomer-modified epoxy siloxane composition as recited in claim 15 wherein the elastomer-modified epoxy siloxane composition in its cured form exists as a uniformly dispersed arrangement of linear epoxy chain fragments that are cross-linked with a continuous polysiloxane chain.

20. The elastomer-modified epoxy siloxane composition as recited in claim 15 wherein the aminosilane includes at least two active hydrogens, and the epoxy resin has more than one 1,2-epoxide groups per molecule.

21. An elastomer-modified epoxy siloxane composition prepared by combining the contents of;
a first container comprising an epoxy resin, an alkoxy- or silanol-functional silicone intermediate, and a reactive elastomeric resinous intermediate having a functionality selected from the group consisting of hydroxyl, epoxy, isocyanate, carboxyl, mercaptan, and amine; with
a second container comprising an amine ingredient selected from the group consisting of amino-functional compounds and aminofunctional silicone compounds.

* * * * *